United States Patent [19]
Shoji

[11] Patent Number: 5,610,769
[45] Date of Patent: Mar. 11, 1997

[54] INTERNAL FOCUSING TELEPHOTO LENS SYSTEM

[75] Inventor: Yoshitomo Shoji, Tokyo, Japan

[73] Assignee: Nikon Corporation, Tokyo, Japan

[21] Appl. No.: 492,759

[22] Filed: Jun. 21, 1995

[30] Foreign Application Priority Data

Jun. 23, 1994 [JP] Japan .................................. 6-164531

[51] Int. Cl.$^6$ .................. G02B 13/02; G02B 9/64
[52] U.S. Cl. ........................... 359/745; 359/755
[58] Field of Search ........................ 359/684, 689, 359/690, 745, 746, 747, 748, 755, 775

[56] References Cited

U.S. PATENT DOCUMENTS

| | | | |
|---|---|---|---|
| 4,113,357 | 12/1978 | Nakamura | 359/745 |
| 4,176,913 | 12/1979 | Nakamura et al. | 359/746 |
| 4,534,626 | 8/1985 | Mihara | 359/745 |
| 5,323,270 | 6/1994 | Sato | 359/745 |
| 5,438,455 | 8/1995 | Nakatsuji et al. | 359/745 |
| 5,490,014 | 2/1996 | Suzuki | 359/745 |

FOREIGN PATENT DOCUMENTS

| | | |
|---|---|---|
| 52-55639 | 5/1977 | Japan . |
| 57-165809 | 10/1982 | Japan . |
| 00810014 | 3/1990 | Japan . |
| 404238311 | 8/1992 | Japan . |
| 404294310 | 10/1992 | Japan . |

*Primary Examiner*—Scott J. Sugarman
*Attorney, Agent, or Firm*—Shapiro and Shapiro

[57] ABSTRACT

An optical system includes, in the following order from the object side, a first lens unit having a positive refractive power, a second lens unit having a negative refractive power, the second lens unit comprising, in the following order from the object side, a front lens group of a negative refractive power and a rear lens group of a negative refractive power, and a third lens unit having a positive refractive power. In the optical system, focusing to a short-distance object is attained by moving the second lens unit toward the image side, and the optical system satisfies:

$$2.5 < f2R/f2F < 5$$

$$0 \leq D2/f \leq 0.1$$

$$0.15 < 1/(|\phi 2F| \cdot f) < 0.25$$

where f2F is the focal length of a negative lens, closest to the object side, in the second lens unit, f2R is the focal length of a negative lens, closest to the image side, in the second lens unit, f is the focal length of the entire optical system, $\phi 2F$ is the refractive power of a lens surface, closest to the object side, in the rear lens group in the second lens unit, and D2 is the on-axis air gap between the front and rear lens groups in the second lens unit.

44 Claims, 6 Drawing Sheets

INTERNAL FOCUSING TELEPHOTO LENS SYSTEM

BACKGROUND OF THE INVENTION

1. Field of the Invention

The present invention relates to a telephoto lens optical system and, more particularly, to an inner focus type telephoto lens optical system.

2. Related Background Art

As a conventional focusing system of a telephoto lens, a system for attaining focusing by moving the entire lens system in the optical axis direction is used.

However, Japanese Laid-Open Patent Application Nos. 52-55639 and 57-165809, and the like proposed a telephoto lens optical system, which comprises three lens units, in the following order from the object side, a positive lens unit, a negative lens unit, and a positive lens unit, and attains focusing to a short-distance object by moving the negative lens unit toward the image side.

However, in the telephoto lens system disclosed in Japanese Laid-Open Patent Application No. 52-55639, each lens unit itself is required to be sufficiently subjected to aberration correction, so as to suppress variations in aberration upon focusing. However, since the number of lenses is reduced to achieve a compact system, the degree of freedom upon aberration correction is lowered, and as a result, imaging performance at a photographing magnification of ×0.1 or higher is poor.

In the telephoto lens system disclosed in Japanese Laid-Open Patent Application No. 57-165809, the lens surface, closest to the object side, in the second lens unit, which contributes to correction of variations in aberration, has a concave surface facing the object side. For this reason, the lens surface, closest to the object side, in the second lens unit falls outside the range of a minimum angle of deviation for Rund rays in convergent light from the first lens unit having a positive refractive power. Therefore, the second lens unit corrects spherical aberration excessively in the positive direction, and a variation in spherical aberration corresponding to a change in incident angle of Rund rays is generated upon focusing. As a result, preferred imaging performance cannot be obtained.

Note that the Rund rays are light rays, which are parallel to the optical axis and are most separated from the optical axis, in a light beam incident from an infinity object, i.e., maximum height light rays.

SUMMARY OF THE INVENTION

The present invention has been made in consideration of the above situation, and has as its object to provide a telephoto lens optical system with good imaging performance.

In order to achieve the above object, according to the present invention, there is provided an optical system, which comprises, in the following order from the object side, a first lens unit G1 having a positive refractive power, a second lens unit G2 having a negative refractive power, and a third lens unit G3 having a positive refractive power, and attains focusing to a short-distance object by moving the second lens unit G2 toward the image side, wherein the second lens unit G2 comprises, in the following order from the object side, a front lens group having a negative refractive power and a rear lens unit having a negative refractive power, and the optical system satisfies the following conditions:

$$2.5 < f2R/f2F < 5 \quad (1)$$

$$0 \leq D2/f \leq 0.1 \quad (2)$$

$$0.15 < 1/(|\phi 2F| \cdot f) < 0.25 \quad (3)$$

where f2F is the focal length of a negative lens, closest to the object side (i.e., the front lens group), in the second lens unit G2, f2R is the focal length of a negative lens, closest to the image side(i.e., the rear lens group), in the second lens unit G2, f is the focal length of the entire optical system, $\phi 2F$ is the refractive power of a lens surface, closest to the object side, in the rear lens group in the second lens unit, and D2 is the on-axis air gap between the front and rear lens groups in the second lens unit.

According to a preferred aspect of the present invention, the first and second lens units G1 and G2 form an almost afocal optical system as a whole.

Furthermore, the first lens unit G1 comprises, in the following order from the object side, two positive lenses L1 and L2, a negative lens L3, and a cemented lens L4 which is composed of a negative meniscus lens with a convex surface facing the object side and a positive meniscus lens with a convex surface facing the object side, and has a positive refractive power as a whole, and the Abbe's number, vd3, of the negative lens L3 in the first lens unit G2 preferably satisfies a condition: $35 < vd3 < 100$.

As described above, the telephoto lens optical system of the present invention satisfies conditional formulas (1) to (3) above.

Conditional formula (1) defines a condition for satisfactorily correcting a variation in spherical aberration upon focusing, and spherical aberration.

When f2R/f2F exceeds the upper limit value of conditional formula (1), the refractive power of the front lens group in the second lens unit G2 becomes too large, and excessive high-order aberrations are generated in spherical aberration by the lenses in the front lens group alone. Therefore, such large f2R/f2F is not preferable since it becomes difficult to satisfactorily correct spherical aberration when the second lens unit G2 is constituted by a small number of lenses as in the present invention.

On the contrary, when f2R/f2F is smaller than the lower limit value of conditional formula (1), the refractive index of the rear lens group in the second lens unit G2 becomes too strong. For this reason, the refractive power of a lens surface, closest to the object side, in the rear lens group in the second lens unit G2 becomes too strong, and a considerable variation occurs in spherical aberration in this lens surface alone. Therefore, such small f2R/f2F is not preferable since it becomes difficult to satisfactorily correct spherical aberration when the second lens unit G2 is constituted by a small number of lenses as in the present invention.

When some lens components have cemented lens surfaces, the second lens unit G2 as a whole can attain achromaticity, and can suppress a variation in chromatic aberration upon focusing.

In order to attain aberration correction more satisfactorily, the lower limit value of conditional formula (1) is preferably set to be 2.8, and the upper limit value is preferably set to be 4.3.

Conditional formula (2) is a condition for defining an appropriate range in association with the on-axis air gap between the front and rear lens groups in the second lens unit G2, i.e., a condition for satisfactorily correcting a variation in curvature of field by suppressing a change in principal ray height upon focusing.

Note that principal rays mean light rays, which pass the center of an aperture stop, in a light beam focused at an off-center position. The principal ray height means the distance between the optical axis and the principal rays. Therefore, a large principal ray height means a large distance between the optical axis and the principal rays, and a small principal ray height means a small distance between the optical axis and the principal rays.

The second lens unit G2 is a so-called focusing lens unit which moves along the optical axis to attain focusing. More specifically, upon focusing to a short-distance object, the second lens unit G2 moves toward the image side. Therefore, the height of principal rays incident on the front lens group in the second lens unit decreases upon focusing to a short-distance object. In other words, the principal ray height is maximized upon focusing to an infinity object, and is minimized upon focusing to a shortest-distance object.

The front lens group in the second lens unit comprises a negative lens, and has a function of increasing the height of principal rays incident on the rear lens group. In particular, since the front lens group must be designed as a negative lens group whose refractive power accounts for 60% or more of the total refractive power of the second lens unit G2, it has a strong function of increasing the principal ray height. Therefore, if the on-axis air gap between the front and rear lens groups is large, a change in principal ray height upon focusing in the rear lens group becomes larger than that in the front lens group. More specifically, in order to suppress a change in principal ray height in the rear lens group, the on-axis air gap between the front and rear lens groups is preferably limited to fall within a predetermined range.

Furthermore, by limiting the on-axis air gap between the front and rear lens groups to fall within a predetermined range, the lens constituting members of the front and rear lens groups can be easily combined into a single manufacturing unit. For this reason, the second lens unit G2 as a focusing lens unit can be rendered compact, and the load on a driving mechanism for focusing is reduced, thus allowing a focusing operation with quick response.

When D2/f exceeds the upper limit value of conditional formula (2), a variation in curvature of field becomes excessive, and the lens units other than the second lens unit cannot correct the variation in curvature of field. More specifically, in the present invention, the first and third lens units G1 and G3 are designed as so-called fixed lens units which do not move along the optical axis upon focusing. For this reason, the first and third lens units G1 and G3 do not have a sufficient function for correcting the variation in curvature of field, and cannot sufficiently correct it.

Furthermore, when the gap between the front and rear lens groups in the second lens unit G2 is too large, the total lens length of the focusing lens unit becomes large. As a result, the weight of a holding mechanism for a focusing optical system increases, and the load on the driving mechanism for focusing increases, thus disturbing a focusing operation with quick response.

The reason why the lower limit value of conditional formula (2) is set to be 0 is that it is physically impossible to set the on-axis air gap between the front and rear lens groups in the second lens unit G2 to be smaller than 0.

In order to attain aberration correction more satisfactorily, the upper limit value of conditional formula (2) is preferably set to be 0.05.

Conditional formula (3) is a condition for defining an appropriate range in association with the refractive power of the lens surface, closest to the object side, of the rear lens group in the second lens unit.

The lens surface, closest to the object side, of the rear lens group is a lens surface having a negative refractive power, and excessively corrects spherical aberration in the positive direction upon photographing of an infinity object. Upon focusing to a short-distance object by moving the second lens unit G2 toward the image side, since the height of Rund rays incident on the second lens unit G2 decreases, and the divergent effect of the lens surface is weakened, aberration correction cannot be satisfactorily corrected.

Furthermore, since the lens surface, closest to the object side, of the rear lens group has a particularly large contribution to spherical aberration among the lens surfaces of the second lens unit, this lens surface is a main cause of a variation in spherical aberration upon focusing. A variation in spherical aberration caused by the lens surface, closest to the object side, in the rear lens group and a variation in spherical aberration caused by the first lens unit G2 preferably have opposite directions and substantially equal amounts.

Therefore, in order to minimize the variation in spherical aberration, aberration correction should be attained by relating the refractive power of the first lens unit G1 and the refractive power of the lens surface, closest to the object side, of the rear lens group in the second lens unit. Since changing the refractive power of the first lens unit G2 is a main factor of changing the total lens length, the lens surface, closest to the object side, of the rear lens group in the second lens unit also becomes a factor of changing the total lens length.

When $1/(|\phi 2F|\cdot f)$ exceeds the upper limit value of conditional formula (3), a variation in spherical aberration generated in the lens surface, closest to the object side, of the rear lens group becomes too small. As a result, since a variation in spherical aberration generated in the first lens unit G1 is also required to be satisfactorily corrected using a small number of lenses, the refractive power of the first lens unit G1 must be weakened. However, when the refractive power of the first lens unit G1 is weakened, the total lens length is prolonged. For this reason, such large $1/(|\phi 2F|\cdot f)$ is not preferable.

On the contrary, when $1/(|\phi 2F|\cdot f)$ is smaller than the lower limit value of conditional formula (3), a variation in spherical aberration generated in the lens surface, closest to the object side, of the rear lens group exceeds a variation in spherical aberration generated in the first lens unit G1, and the variation in spherical aberration cannot be corrected as a whole. For this reason, such small $1/(|\phi 2F|\cdot f)$ is not preferable.

In order to attain aberration correction more satisfactorily, the lower limit value of conditional formula (3) is preferably set to be 0.17, and the upper limit value is preferably set to be 0.21.

Furthermore, in order to obtain an optical system which can reduce a variation in aberration upon focusing, the first and second lens units G1 and G2 are preferably synthesized to form an afocal optical system. When the posterior focal point (image-side focal point) of the first lens unit G1 is designed to match the anterior focal point (object-side focal point) of the second lens unit G2 to realize an afocal optical system, the magnification of the second lens unit G2 becomes constant independently of the object distance, and a variation in aberration caused by a change in angle of incident light rays can be prevented. Furthermore, since light rays incident on the third lens unit G3 always become parallel light rays free from a change in angle, almost no variation in aberration occurs in the third lens unit G3.

In order to further improve imaging performance, the first lens unit G1 preferably comprises, in the following order from the object side, two positive lenses L1 and L2, a negative lens L3, and a cemented lens L4 which is composed of a negative meniscus lens with a convex surface facing the object side and a positive meniscus lens with a convex surface facing the object side, and has a positive refractive power as a whole, and preferably satisfies conditional formula (4) below:

$$35 < vd3 < 100 \quad (4)$$

where vd3: the Abbe's number of the negative lens L3 in the first lens unit G1

When vd3 is smaller than the lower limit value of conditional formula (4), the amount of second-order on-axis chromatic aberration increases, and such small vd3 is not therefore preferable.

When a focusing operation from infinity to a short-distance is performed, the image magnification by the first lens unit G1 increases, and on-axis chromatic aberration tends to become large. However, when conditional formula (4) is satisfied, on-axis chromatic aberration can be suppressed even upon focusing up to a photographing magnification of about ×1/10.

In order to constitute the second lens unit G2 using a small number of lenses, on-axis chromatic aberration caused by the first lens unit G1 must be reduced, and it is not preferable if vd3 falls outside the range of conditional formula (4) in this respect as well.

No existing optical glass material for visible light rays has an Abbe's number exceeding the upper limit value of conditional formula (4). If it is temporarily assumed that the Abbe's number exceeds the upper limit value of conditional formula (4), the refractive power of the negative lens L3 must be increased to correct chromatic aberration caused by the positive lenses L1 and L2. As a result, spherical aberration of a magnitude beyond the correction performance of the positive lenses L1 and L2 is generated by the negative lens L3, and thus such a large Abbe's number is not preferable.

In order to attain aberration correction more satisfactorily, the upper limit value of conditional formula (4) is preferably set to be 45.

DETAILED DESCRIPTION OF THE PREFERRED EMBODIMENTS

The preferred embodiments of the present invention will be described hereinafter with reference to the accompanying drawings.

An optical system according to each embodiment of the present invention comprises, in the following order from the object side, a first lens unit G1 having a positive refractive power, a second lens unit G2 having a negative refractive power, and a third lens unit G3 having a positive refractive power, and attains focusing to a short-distance object by moving the second lens unit G2 toward the image side. In this optical system, the second lens unit G2 comprises, in the following order from the object side, a front lens group having a negative refractive power, and a rear lens group having a negative refractive power.

[First Embodiment]

Figure 1:
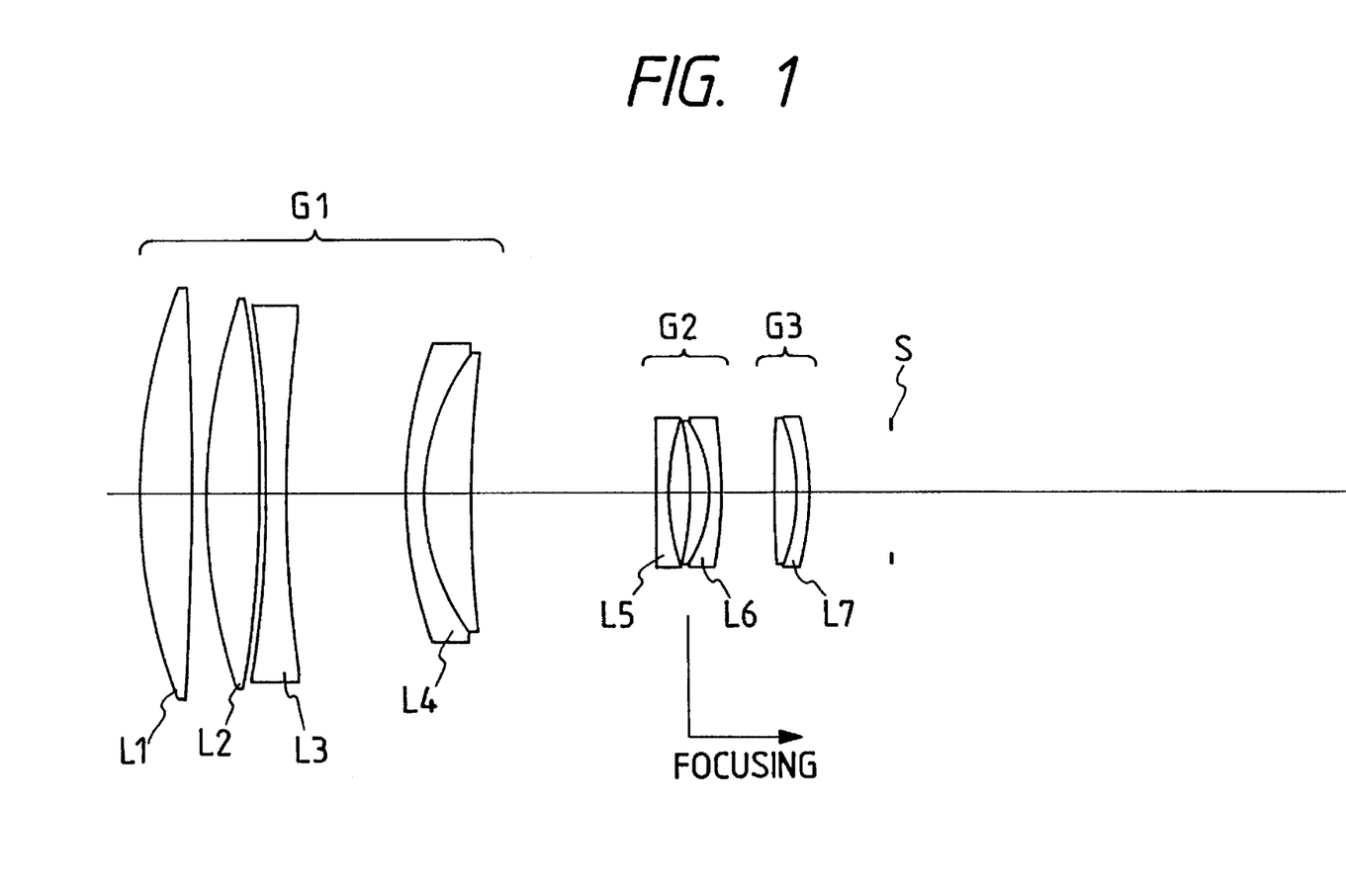
FIG. 1 is a view showing the arrangement of a telephoto lens optical system according to a first embodiment of the present invention.
Figure 2A:
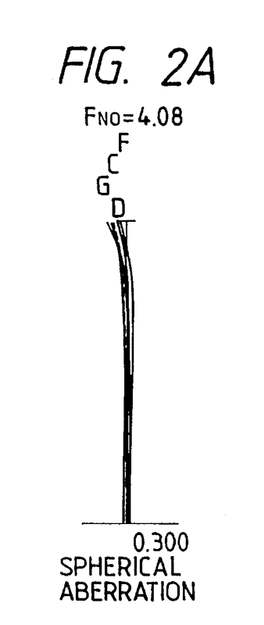
FIGS. 2A to 2F are graphs showing various aberrations in an infinity focusing state of the first embodiment.
Figures 2B, 2C:
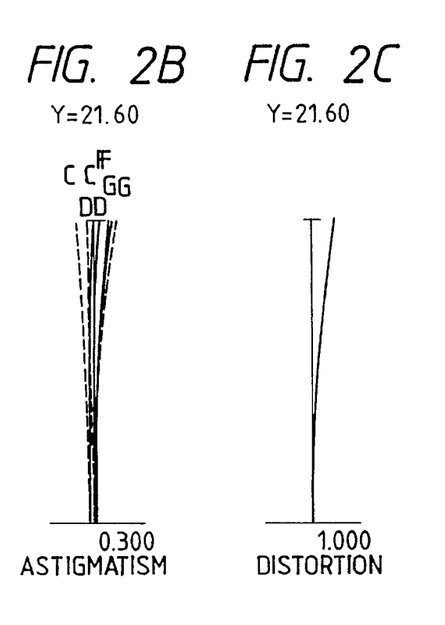
Figure 2D:
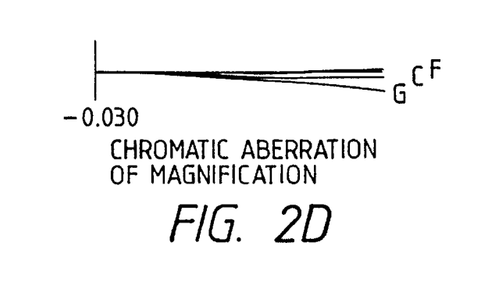
Figure 2E:
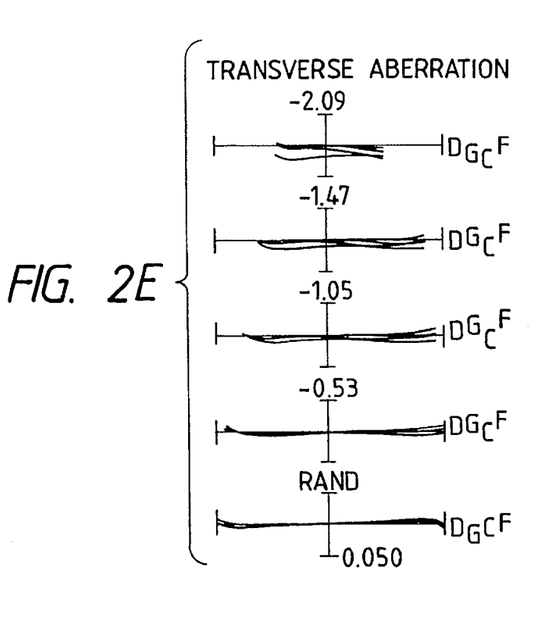
Figure 2F:
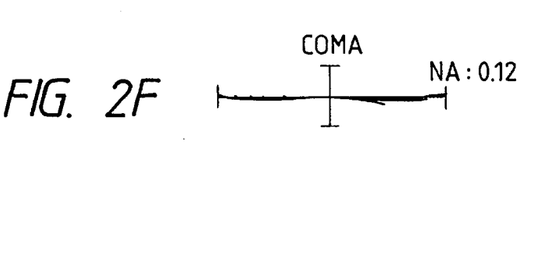
Figure 3A:
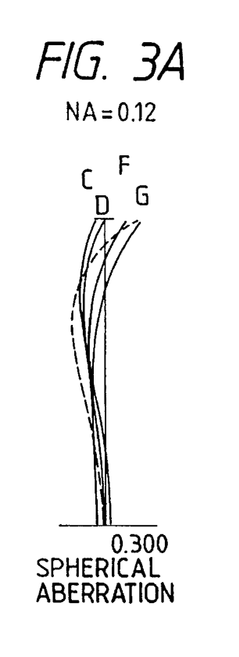
FIGS. 3A to 3F are graphs showing various aberrations in a short-distance focusing state of the first embodiment.
Figure 3B:
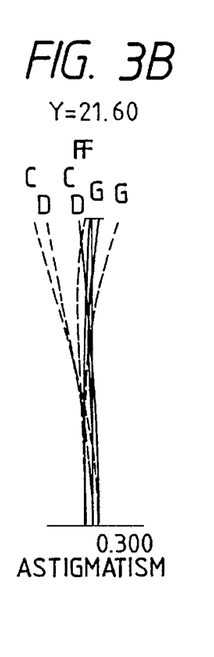
Figure 3C:
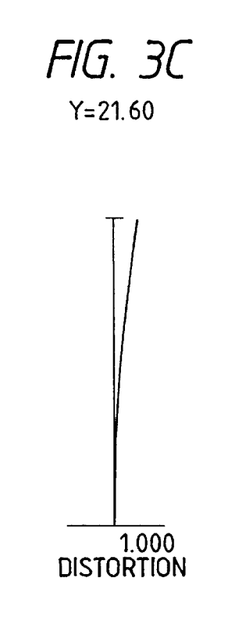
Figure 3D:
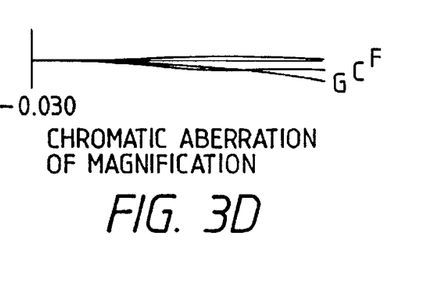
Figure 3E:
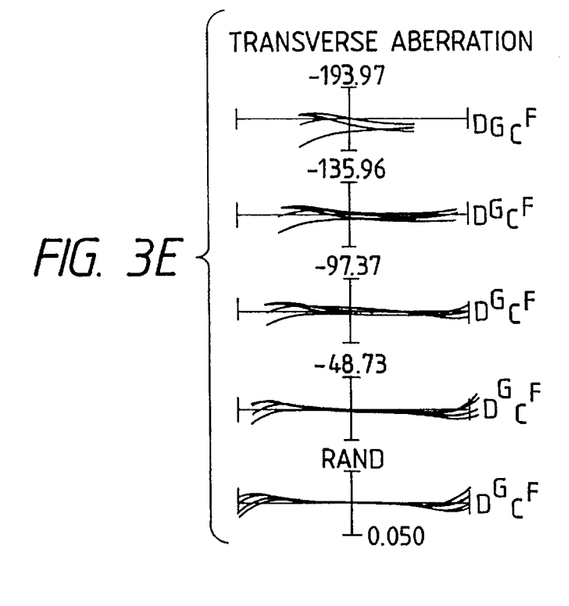
Figure 3F:
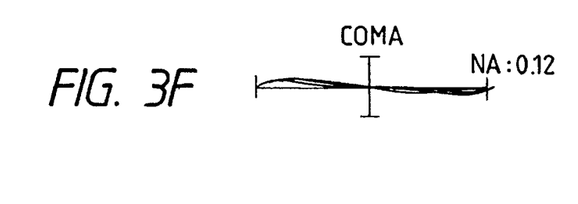

FIG. 1 is a view showing the arrangement of a telephoto lens optical system according to the first embodiment of the present invention.

The telephoto lens optical system shown in FIG. 1 comprises, in the following order from the object side: a first lens unit G1 consisting of a biconvex lens L1, a biconvex lens L2, a biconcave lens L3, and a cemented positive lens L4 composed of a negative meniscus lens with a convex surface facing the object side and a positive meniscus lens with a convex surface facing the object side; a second lens unit G2 consisting of a negative meniscus lens L5 with a convex surface facing the object side, and a cemented negative lens L6 composed of a positive meniscus lens with a concave surface facing the object side and a negative meniscus lens with a concave surface facing the object side; and a third lens unit G3 consisting of a cemented positive lens L7 composed of a biconvex lens and a negative meniscus lens with a concave surface facing the object side.

As described above, the negative meniscus lens L5 constitutes a front lens group of the second lens unit, and the cemented negative lens L6 constitutes a rear lens group of the second lens unit. An aperture stop S is inserted at the image side of the third lens unit G3.

Table 1 below summarizes data values according to the first embodiment of the present invention. In Table 1, f is the focal length, FNO is the f-number, and 2ω is the field angle. Furthermore, the surface number represents the order of lens surfaces from the object side, and the values of the refractive index and Abbe's number correspond to those for the d-line (λ=587.6 nm).

TABLE 1

| | | f = 588 mm<br>FNO = 4.1<br>2ω = 4.2° | | |
|---|---|---|---|---|
| Surface Number | Radius of Curvature | Surface Interval | Abbe's Number | Refractive Index |
| 1 | 199.668 | 19.80 | 82.5 | 1.49782 |
| 2 | −903.941 | 4.20 | | |
| 3 | 211.663 | 18.70 | 82.5 | 1.49782 |
| 4 | −554.241 | 3.00 | | |
| 5 | −496.574 | 7.70 | 40.9 | 1.79631 |
| 6 | 434.770 | 45.50 | | |
| 7 | 165.330 | 5.50 | 53.9 | 1.71300 |
| 8 | 78.881 | 17.20 | 67.9 | 1.59319 |
| 9 | 360.129 | | | |
| | (d9 = variable) | | | |
| 10 | 8715.646 | 4.30 | 49.5 | 1.77279 |
| 11 | 80.539 | 8.40 | | |
| 12 | −95.423 | 7.00 | 25.4 | 1.80518 |
| 13 | −47.614 | 4.00 | 52.3 | 1.74810 |
| 14 | −162.956 | | | |
| | (d14 = variable) | | | |
| 15 | 959.581 | 7.50 | 82.5 | 1.49782 |
| 16 | −73.323 | 5.00 | 25.5 | 1.80458 |
| 17 | −94.745 | 30.00 | | |
| 18 | ∞ | Bf = 177.25 (aperture stop) | | |

TABLE 1-continued (Variable intervals Upon Focusing)

| | Infinity Focusing State (f = 588) | Short-distance Focusing State (Photographing Distance = 6 m) |
|---|---|---|
| d9 | 68.84 | 82.77 |
| d14 | 20.09 | 6.16 |
| Bf | 177.25 | 177.25 |

(The photographing distance is the distance between the object and the image surface along the optical axis.)
(Condition Corresponding Values)

f2R = −419.59
f2F = −105.21
D2 = 8.4
|φ2F| = 0.0084
(1) f2R/f2F = 3.99
(2) D2/f = 0.01
(3) 1/(|φ2F| · f) = 0.20
(4) vd3 = 40.9

FIGS. 2A to 2F and FIGS. 3A to 3F are graphs showing various aberrations of the first embodiment. FIGS. 2A to 2F are graphs showing various aberrations in an infinity focusing state, and FIGS. 3A to 3F are graphs showing various aberrations in a short-distance focusing state (photographing distance=6 m).

In these graphs, FNO is the f-number, NA is the numerical aperture, Y is the image height, D is the d-line (λ=587.6 nm), G is the g-line (λ=435.8 nm), C is the C-line (λ=656.3 nm), and F is the F-line (λ=486.1 nm).

In each graph showing astigmatism, a solid curve represents the sagittal image surface, and a broken curve represents the meridional image surface. Furthermore, in each graph showing spherical aberration, a broken curve represents a sine condition.

As can be seen from these graphs, in this embodiment, various aberrations are satisfactorily corrected from the infinity focusing state to the closest distance photographing state.

[Second Embodiment]

Figure 4:
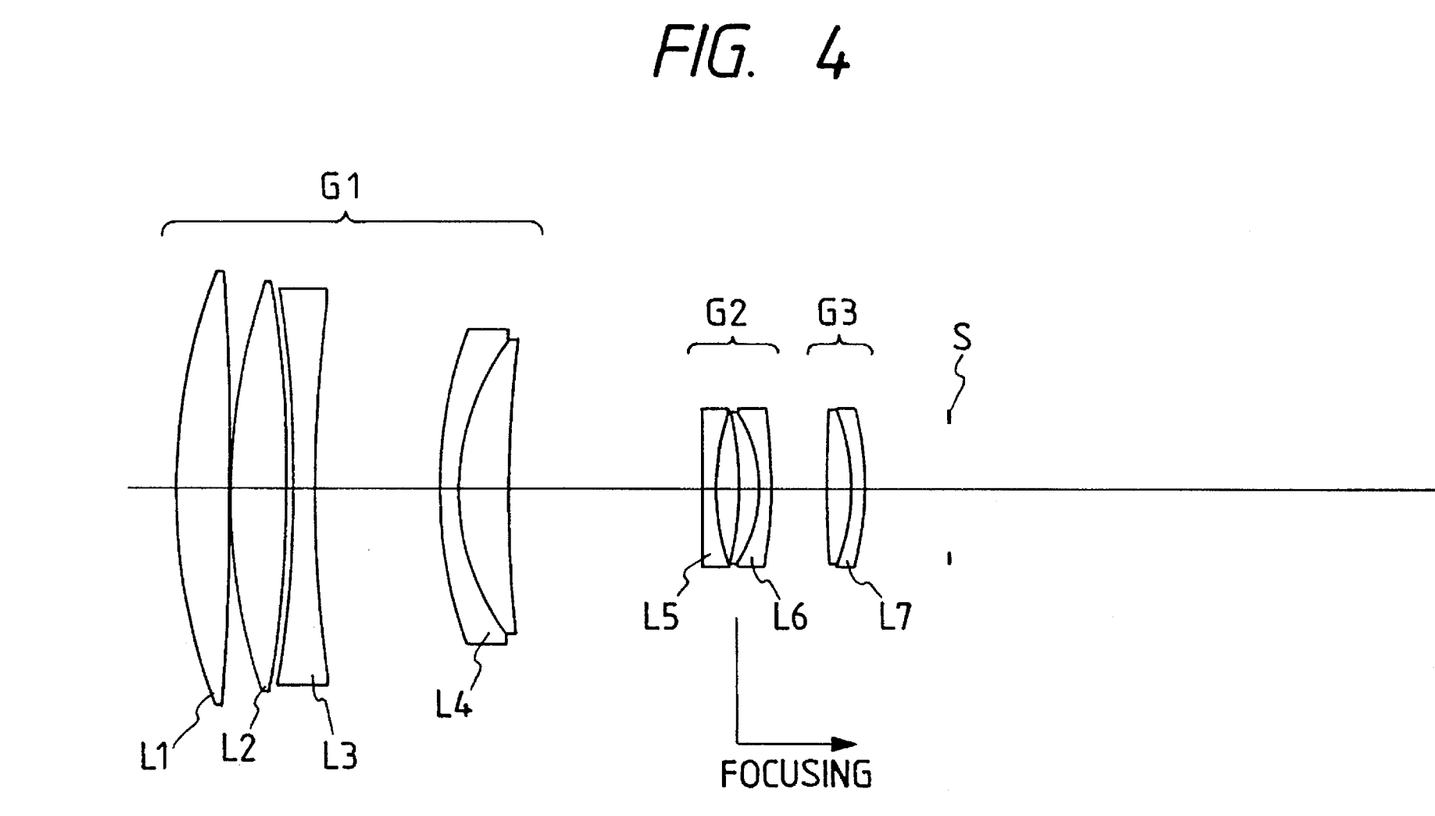
FIG. 4 is a view showing the arrangement of a telephoto lens optical system according to a second embodiment of the present invention.
Figure 5A:
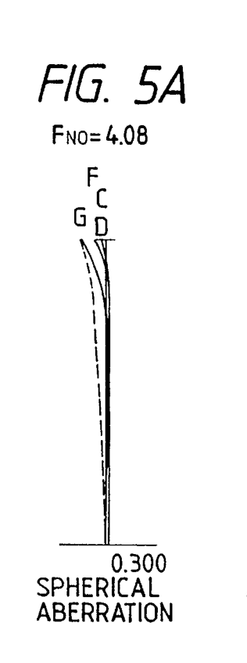
FIGS. 5A to 5F are graphs showing various aberrations in an infinity focusing state of the second embodiment.
Figure 5B:
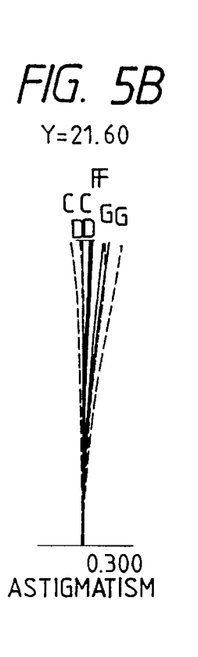
Figure 5C:
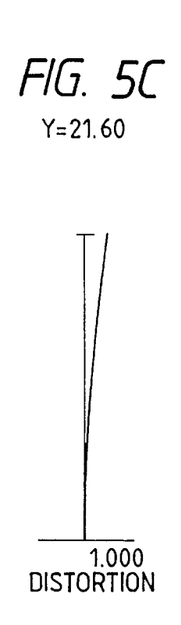
Figure 5D:
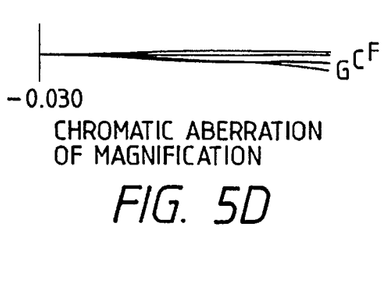
Figure 5E:
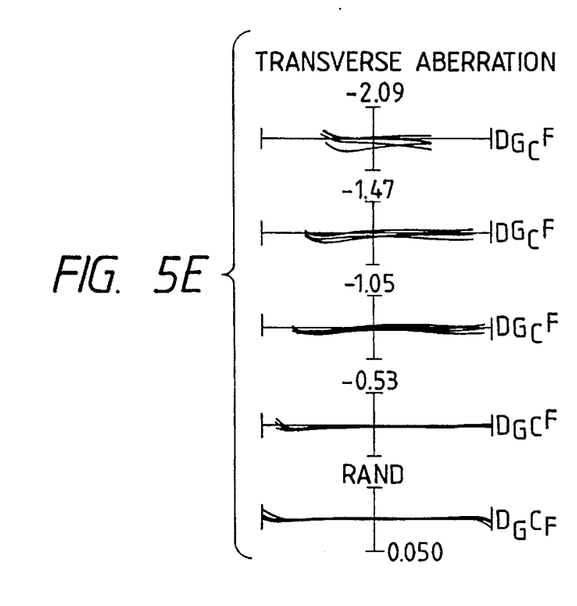
Figure 5F:
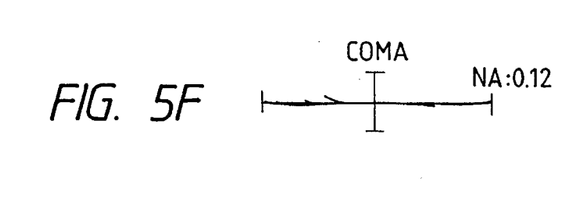
Figure 6A:
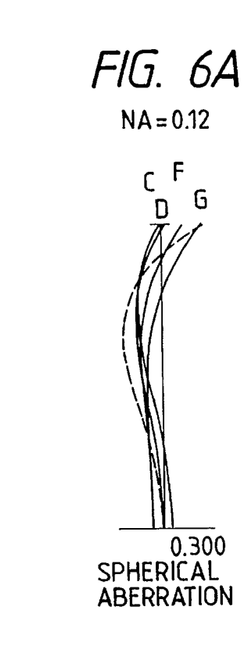
FIGS. 6A to 6F are graphs showing various aberrations in a short-distance focusing state of the second embodiment.
Figure 6B:
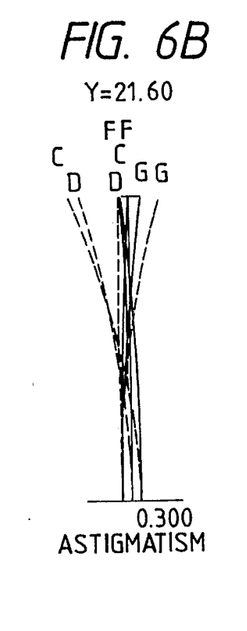
Figure 6C:
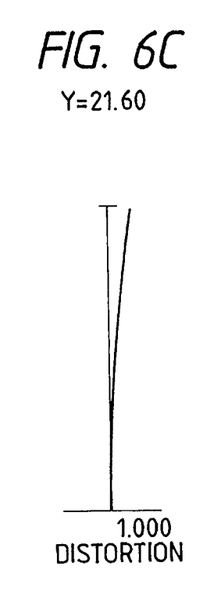
Figure 6D:
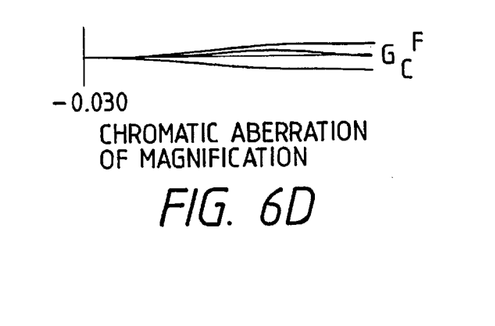
Figure 6E:
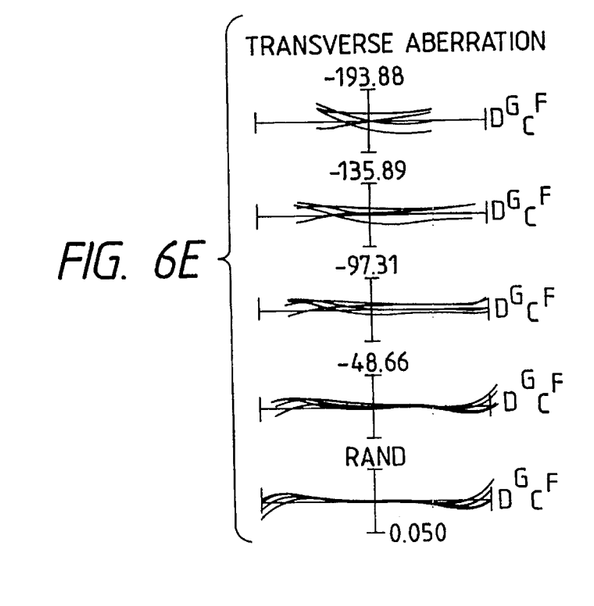
Figure 6F:
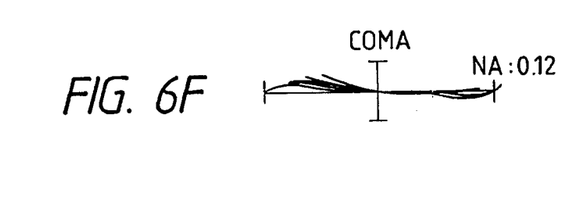

FIG. 4 is a view showing the arrangement of a telephoto lens optical system according to the second embodiment of the present invention.

The telephoto lens optical system shown in FIG. 4 comprises, in the following order from the object side: a first lens unit G1 consisting of a biconvex lens L1, a biconvex lens L2, a biconcave lens L3, and a cemented positive lens L4 composed of a negative meniscus lens with a convex surface facing the object side and a positive meniscus lens with a convex surface facing the object side; a second lens unit G2 consisting of a negative meniscus lens L5 with a convex surface facing the object side, and a cemented negative lens L6 composed of a positive meniscus lens with a concave surface facing the object side and a negative meniscus lens with a concave surface facing the object side; and a third lens unit G3 consisting of a cemented positive lens L7 composed of a biconvex lens and a negative meniscus lens with a concave surface facing the object side.

As described above, the negative meniscus lens L5 constitutes a front lens group of the second lens unit, and the cemented negative lens L6 constitutes a rear lens group of the second lens unit. An aperture stop S is inserted at the image side of the third lens unit G3.

Table 2 below summarizes data values according to the second embodiment of the present invention. In Table 2, f is the focal length, FNO is the f-number, and 2ω is the field angle. Furthermore, the surface number represents the order of lens surfaces from the object side, and the values of the refractive index and Abbe's number correspond to those for the d-line (λ=587.6 nm).

TABLE 2 f = 588 mm
FNO = 4.1
2ω = 4.2°

| Surface Number | Radius of Curvature | Surface Interval | Abbe's Number | Refractive Index |
|---|---|---|---|---|
| 1 | 194.245 | 20.20 | 82.5 | 1.49782 |
| 2 | −845.924 | 0.10 | | |
| 3 | 190.961 | 19.40 | 82.5 | 1.49782 |
| 4 | −576.418 | 3.00 | | |
| 5 | −516.814 | 7.70 | 40.9 | 1.79631 |
| 6 | 463.227 | 42.00 | | |
| 7 | 154.646 | 5.50 | 53.9 | 1.71300 |
| 8 | 72.458 | 16.20 | 67.9 | 1.59319 |
| 9 | 225.046 | | | |
| | (d9 = variable) | | | |
| 10 | 465.048 | 4.30 | 46.4 | 1.80411 |
| 11 | 75.626 | 8.60 | | |
| 12 | −91.034 | 6.50 | 25.4 | 1.80518 |
| 13 | −48.450 | 4.00 | 46.4 | 1.80411 |
| 14 | −144.658 | | | |
| | (d14 = variable) | | | |
| 15 | 2808.243 | 6.00 | 82.5 | 1.49782 |
| 16 | −84.000 | 5.00 | 31.1 | 1.68893 |
| 17 | −98.985 | 30.00 | | |
| 18 | ∞ | Bf = 176.80 (aperture stop) | | |

(Variable intervals Upon Focusing)

| | Infinity Focusing State (f = 588) | Short-distance Focusing State (Photographing Distance = 6 m) |
|---|---|---|
| d9 | 64.57 | 75.89 |
| d14 | 19.39 | 8.07 |
| Bf | 176.80 | 176.80 |

(The photographing distance is the distance between the object and the image surface along the optical axis.)
(Condition Corresponding Values)

f2R = −335.85
f2F = −112.87
D2 = 8.6
|φ2F| = 0.0088
(1) f2R/f2F = 2.98
(2) D2/f = 0.01
(3) 1/(|φ2F| · f) = 0.19
(4) vd3 = 40.9

FIGS. 5A to 5F and FIGS. 6A to 6F are graphs showing various aberrations of the second embodiment. FIGS. 5A to 5F are graphs showing various aberrations in an infinity focusing state, and FIGS. 6A to 6F are graphs showing various aberrations in a short-distance focusing state (photographing distance=6 m).

In these graphs, FNO is the f-number, NA is the numerical aperture, Y is the image height, D is the d-line (λ=587.6 nm), G is the g-line (λ=435.8 nm), C is the C-line (λ=656.3 nm), and F is the F-line (λ=486.1 nm).

In each graph showing astigmatism, a solid curve represents the sagittal image surface, and a broken curve represents the meridional image surface. Furthermore, in each graph showing spherical aberration, a broken curve represents a sine condition.

As can be seen from these graphs, in this embodiment, various aberrations are satisfactorily corrected from the infinity focusing state to the closest distance photographing state.

In each of the above embodiments, the aperture stop S is inserted at the image side of the third lens unit G3, but may be inserted between the second and third lens units G2 and G3.

Furthermore, by moving the third lens unit G3 in a direction substantially perpendicular to the optical axis, a so-called image-vibration correction effect for appropriately correcting a variation in image position caused by, e.g., a camera shake can be obtained. In this case, the third lens unit G3 preferably comprises a positive/negative/positive, 3-group/3-lens arrangement.

Optical members such as protective glass having substantially no refractive power may be added before and after the optical system within the scope of the present invention.

As described above, according to the present invention, a telephoto lens system, which has a short total lens length, good operability, and high imaging performance, can be provided.

What is claimed is:

1. An optical system comprising in the following order from the object side:

a first lens unit having a positive refractive power;

a second lens unit having a negative refractive power, said second lens unit comprising, in the following order from the object side, a front lens group having a negative refractive power and a rear lens group having a negative refractive power; and a third lens unit having a positive refractive power, wherein focusing to a short-distance object is attained by moving said second lens unit toward an image side, and said optical system satisfies:

$2.5 < f2R/f2F < 5$ $0 \leq D2/f \leq 0.1$ $0.15 < 1/(l\phi 2F \cdot f) < 0.25$ where f2F: the focal length of said front lens group in said second lens unit f2R: the focal length of said rear lens group in said second lens unit f: the focal length of the entire optical system $\phi$2F: the refractive power of a lens surface, closest to the object side, in said rear lens group in said second lens unit D2: the on-axis air gap between said front and rear lens groups in said second lens unit.

2. An optical system according to claim 1, wherein said first and second lens units form a substantially afocal optical system as a whole.

3. An optical system according to claim 1, wherein said first lens unit comprises, in the following order from the object side, two positive lenses, a negative lens, and a cemented lens which is composed of a negative meniscus lens with a convex surface facing the object side and a positive meniscus lens with a convex surface facing the object side, and has a positive refractive power as a whole, and an Abbe's number vd3 of said negative lens in said first lens unit satisfies:

$35 < vd3 < 100$.

4. An optical system according to claim 2, wherein said first lens unit comprises, in the following order from the object side, two positive lenses, a negative lens, and a cemented lens which is composed of a negative meniscus lens with a convex surface facing the object side and a positive meniscus lens with a convex surface facing the object side, and has a positive refractive power as a whole, and an Abbe's number vd3 of said negative lens in said first lens unit satisfies:

$35 < vd3 < 100$.

5. An optical system according to claim 1, wherein said first lens unit comprises, in the following order from the object side, two positive lenses, a negative lens, and a cemented lens which is composed of a negative meniscus lens with a convex surface facing the object side and a positive meniscus lens with a convex surface facing the object side, and has a positive refractive power as a whole, and an Abbe's number vd3 of said negative lens in said first lens unit satisfies:

$35 < vd3 < 45$.

6. An optical system according to claim 2, wherein said first lens unit comprises, in the following order from the object side, two positive lenses, a negative lens, and a cemented lens which is composed of a negative meniscus lens with a convex surface facing the object side and a positive meniscus lens with a convex surface facing the object side, and has a positive refractive power as a whole, and an Abbe's number vd3 of said negative lens in said first lens unit satisfies:

$35 < vd3 < 45$.

7. An optical system according to claim 3, wherein an aperture stop is arranged in the vicinity of said third lens unit.

8. An optical system according to claim 4, wherein an aperture stop is arranged in the vicinity of said third lens unit.

9. An optical system according to claim 5, wherein an aperture stop is arranged in the vicinity of said third lens unit.

10. An optical system according to claim 6, wherein an aperture stop is arranged in the vicinity of said third lens unit.

11. An optical system according to claim 1, wherein said third lens unit is moved in a direction substantially perpendicular to an optical axis direction to obtain an image-vibration correction effect.

12. An optical system comprising in the following order from the object side:

a first lens unit having a positive refractive power;

a second lens unit having a negative refractive power, said second lens unit comprising, in the following order from the object side, a front lens group having a negative refractive power and a rear lens group having a negative refractive power; and a third lens unit having a positive refractive power, wherein focusing to a short-distance object is attained by moving said second lens unit toward an image side, and said optical system satisfies:

$2.8 < f2R/f2F < 4.3$ $0 \leq D2/f \leq 0.1$ $0.15 < 1/(l\phi 2F \cdot f) < 0.25$ where f2F: the focal length of said front lens group in said second lens unit f2R: the focal length of said rear lens group in said second lens unit f: the focal length of the entire optical system φ2F: the refractive power of a lens surface, closest to the object side, in said rear lens group in said second lens unit D2: the on-axis air gap between said front and rear lens groups in said second lens unit.

13. An optical system according to claim 12, wherein said first and second lens units form a substantially afocal optical system as a whole.

14. An optical system according to claim 12, wherein said first lens unit comprises, in the following order from the object side, two positive lenses, a negative lens, and a cemented lens which is composed of a negative meniscus lens with a convex surface facing the object side and a positive meniscus lens with a convex surface facing the object side, and has a positive refractive power as a whole, and an Abbe's number vd3 of said negative lens in said first lens unit satisfies:

35<vd3<100.

15. An optical system according to claim 13, wherein said first lens unit comprises, in the following order from the object side, two positive lenses, a negative lens, and a cemented lens which is composed of a negative meniscus lens with a convex surface facing the object side and a positive meniscus lens with a convex surface facing the object side, and has a positive refractive power as a whole, and an Abbe's number vd3 of said negative lens in said first lens unit satisfies:

35<vd3<100.

16. An optical system according to claim 12, wherein said first lens unit comprises, in the following order from the object side, two positive lenses, a negative lens, and a cemented lens which is composed of a negative meniscus lens with a convex surface facing the object side and a positive meniscus lens with a convex surface facing the object side, and has a positive refractive power as a whole, and an Abbe's number vd3 of said negative lens in said first lens unit satisfies:

35<vd3<45.

17. An optical system according to claim 13, wherein said first lens unit comprises, in the following order from the object side, two positive lenses, a negative lens, and a cemented lens which is composed of a negative meniscus lens with a convex surface facing the object side and a positive meniscus lens with a convex surface facing the object side, and has a positive refractive power as a whole, and an Abbe's number vd3 of said negative lens in said first lens unit satisfies:

35<vd3<45.

18. An optical system according to claim 14, wherein an aperture stop is arranged in the vicinity of said third lens unit.

19. An optical system according to claim 15, wherein an aperture stop is arranged in the vicinity of said third lens unit.

20. An optical system according to claim 16, wherein an aperture stop is arranged in the vicinity of said third lens unit.

21. An optical system according to claim 17, wherein an aperture stop is arranged in the vicinity of said third lens unit.

22. An optical system according to claim 11, wherein said third lens unit is moved in a direction substantially perpendicular to an optical axis direction to obtain an image-vibration correction effect.

23. An optical system comprising in the following order from the object side:

a first lens unit having a positive refractive power;

a second lens unit having a negative refractive power, said second lens unit comprising, in the following order from the object side, a front lens group having a negative refractive power and a rear lens group having a negative refractive power; and a third lens unit having a positive refractive power, wherein focusing to a short-distance object is attained by moving said second lens unit toward an image side, and said optical system satisfies:

2.8<f2R/f2F<4.3

0<D2/f≦0.05

0.15<1/(|φ2F|·f)<0.25 where f2F: the focal length of said front lens group in said second lens unit f2R: the focal length of said rear lens group in said second lens unit f: the focal length of the entire optical system φ2F: the refractive power of a lens surface, closest to the object side, in said rear lens group in said second lens unit D2: the on-axis air gap between said front and rear lens groups in said second lens unit.

24. An optical system according to claim 23, wherein said first and second lens units form a substantially afocal optical system as a whole.

25. An optical system according to claim 23, wherein said first lens unit comprises, in the following order from the object side, two positive lenses, a negative lens, and a cemented lens which is composed of a negative meniscus lens with a convex surface facing the object side and a positive meniscus lens with a convex surface facing the object side, and has a positive refractive power as a whole, and an Abbe's number vd3 of said negative lens in said first lens unit satisfies:

35<vd3<100.

26. An optical system according to claim 24, wherein said first lens unit comprises, in the following order from the object side, two positive lenses, a negative lens, and a cemented lens which is composed of a negative meniscus lens with a convex surface facing the object side and a positive meniscus lens with a convex surface facing the object side, and has a positive refractive power as a whole, and an Abbe's number vd3 of said negative lens in said first lens unit satisfies:

35<vd3<100.

27. An optical system according to claim 23, wherein said first lens unit comprises, in the following order from the object side, two positive lenses, a negative lens, and a cemented lens which is composed of a negative meniscus lens with a convex surface facing the object side and a positive meniscus lens with a convex surface facing the object side, and has a positive refractive power as a whole, and an Abbe's number vd3 of said negative lens in said first lens unit satisfies:

35<vd3<45.

28. An optical system according to claim 24, wherein said first lens unit comprises, in the following order from the object side, two positive lenses, a negative lens, and a cemented lens which is composed of a negative meniscus lens with a convex surface facing the object side and a positive meniscus lens with a convex surface facing the object side, and has a positive refractive power as a whole, and an Abbe's number vd3 of said negative lens in said first lens unit satisfies:

35<vd3<45.

29. An optical system according to claim 25, wherein an aperture stop is arranged in the vicinity of said third lens unit.

30. An optical system according to claim 26, wherein an aperture stop is arranged in the vicinity of said third lens unit.

31. An optical system according to claim 27, wherein an aperture stop is arranged in the vicinity of said third lens unit.

32. An optical system according to claim 28, wherein an aperture stop is arranged in the vicinity of said third lens unit.

33. An optical system according to claim 21, wherein said third lens unit is moved in a direction substantially perpendicular to an optical axis direction to obtain an image-vibration correction effect.

34. An optical system comprising in the following order from the object side:

a first lens unit having a positive refractive power;

a second lens unit having a negative refractive power, said second lens unit comprising, in the following order from the object side, a front lens group having a negative refractive power and a rear lens group having a negative refractive power; and a third lens unit having a positive refractive power, wherein focusing to a short-distance object is attained by moving said second lens unit toward an image side, and said optical system satisfies:

2.8<f2R/f2F<4.3

0≦D2/f≦0.05

0.17<1/(|φ2F|·f)<0.21 where f2F: the focal length of said front lens group in said second lens unit f2R: the focal length of said rear lens group in said second lens unit f: the focal length of the entire optical system φ2F: the refractive power of a lens surface, closest to the object side, in said rear lens group in said second lens unit D2: the on-axis air gap between said front and rear lens groups in said second lens unit.

35. An optical system according to claim 34, wherein said first and second lens units form a substantially afocal optical system as a whole.

36. An optical system according to claim 34, wherein said first lens unit comprises, in the following order from the object side, two positive lenses, a negative lens, and a cemented lens which is composed of a negative meniscus lens with a convex surface facing the object side and a positive meniscus lens with a convex surface facing the object side, and has a positive refractive power as a whole, and an Abbe's number vd3 of said negative lens in said first lens unit satisfies:

35<vd3<100.

37. An optical system according to claim 35, wherein said first lens unit comprises, in the following order from the object side, two positive lenses, a negative lens, and a cemented lens which is composed of a negative meniscus lens with a convex surface facing the object side and a positive meniscus lens with a convex surface facing the object side, and has a positive refractive power as a whole, and an Abbe's number vd3 of said negative lens in said first lens unit satisfies:

35<vd3<100.

38. An optical system according to claim 34, wherein said first lens unit comprises, in the following order from the object side, two positive lenses, a negative lens, and a cemented lens which is composed of a negative meniscus lens with a convex surface facing the object side and a positive meniscus lens with a convex surface facing the object side, and has a positive refractive power as a whole, and an Abbe's number vd3 of said negative lens in said first lens unit satisfies:

35<vd3<45.

39. An optical system according to claim 35, wherein said first lens unit comprises, in the following order from the object side, two positive lenses, a negative lens, and a cemented lens which is composed of a negative meniscus lens with a convex surface facing the object side and a positive meniscus lens with a convex surface facing the object side, and has a positive refractive power as a whole, and an Abbe's number vd3 of said negative lens in said first lens unit satisfies:

35<vd3<45.

40. An optical system according to claim 36, wherein an aperture stop is arranged in the vicinity of said third lens unit.

41. An optical system according to claim 31, wherein an aperture stop is arranged in the vicinity of said third lens unit.

42. An optical system according to claim 38, wherein an aperture stop is arranged in the vicinity of said third lens unit.

43. An optical system according to claim 39, wherein an aperture stop is arranged in the vicinity of said third lens unit.

44. An optical system according to claim 31, wherein said third lens unit is moved in a direction substantially perpendicular to an optical axis direction to obtain an image-vibration correction effect.

* * * * *